United States Patent
Day et al.

[15] 3,662,244
[45] May 9, 1972

[54] ELECTRONIC ANGLE LIMITING DEVICE FOR SERVO MECHANISM SYSTEM

[72] Inventors: Richard A. Day, Playa Del Rey; William E. French; Michael A. Riley, both of Los Angeles, all of Calif.

[73] Assignee: The United States of America as represented by the Secretary of the Air Force

[22] Filed: June 15, 1971

[21] Appl. No.: 153,311

[52] U.S. Cl. .............................................. 318/626, 318/661
[51] Int. Cl. ........................................................ G05g 5/00
[58] Field of Search .......................... 318/626, 627, 661, 608

[56] References Cited

UNITED STATES PATENTS 3,403,310  9/1968  Davidoff ................................ 318/626
3,525,918  8/1970  Parnell ................................ 318/626 X Primary Examiner—Benjamin Dobeck
Attorney—Harry A. Herbert, Jr., et al.

[57] ABSTRACT

Angle limiting is achieved in a tangent servo system by modifying the sine input to the servo system. The product of the cosine input and the appropriate one of two constants representing the tangents of the maximum excursion angles is selected by control circuits and switched into the servo motor drive circuit when such maximum excursion is reached. An unmodified sine input is provided by the control circuits for normal operation between maximum excursion limits.

1 Claim, 4 Drawing Figures

ELECTRONIC ANGLE LIMITING DEVICE FOR SERVO MECHANISM SYSTEM

BACKGROUND OF THE INVENTION

This invention relates to tangent servo systems that use direction cosines to provide angular positioning information, and in particular to improved electronic angle limiting means for use therewith.

Angular excursion limits of a servo system are commonly set by means of limit switches which detect the maximum excursion of the device being positioned and control either the gain of the servo amplifier or some other element in the servo loop to reduce the excitation to the drive motor. When the device being positioned is away from the maximum excursion points the limit switches are open and the gain of the servo loop is at normal level. Such an approach however requires that modification be made to the servo package. It is also necessary to modify the servo amplifier to accommodate the gain switching. Limit switches further have accuracy limitations and require frequent adjustment and appreciable maintenance. There currently exists, therefore, the need for servo system angle limiting devices that are not subject to these limitations. The present invention is directed toward providing such improved devices.

SUMMARY OF THE INVENTION

In servo systems of the type comprehended by the present invention the servo motor is driven by a supply voltage $e_x$ which may be represented as:

$$e_x = j\cos\theta - i\sin\theta \quad (1)$$

wherein $j$ and $i$ are vector quantities and $\theta$ is the position angle. The present invention utilizes the ratio of $j$ to $i$ to determine the position of the servo. Angle limits are set by making $j$ equal to $i \tan\theta$ ($\theta$ being the desired limit angle). This is accomplished by switching circuits and control circuits that substitute the $i$ input as modified by a constant (resistance arrangement that produces the desired $\tan\theta$) for the $j$ input when the limit angle has been reached or exceeded.

It is a principal object of the invention to provide a new and improved electronic angle limiting device for a servo mechanism system.

It is another object of the invention to provide an angle limiting device for a servo mechanism system that does not require modification of the servo package.

It is another object of the invention to provide an angle limiting device for a servo mechanism system that does not require modification of the servo amplifier.

These, together with other objects, features and advantages of the invention, will become more readily apparent from the following detailed description when taken in conjunction with the accompanying drawings.

DETAILED DESCRIPTION OF THE PREFERRED EMBODIMENT

The electronic angle limiter of the present invention will be described having reference to the simple follow-up resolver system of FIG. 1. In this system the device 9 to be positioned is mechanically rotated by servo motor 6 through mechanical linkage 8. Angle excursion is limited by limiter 10 as hereinafter described.

Figure 1:
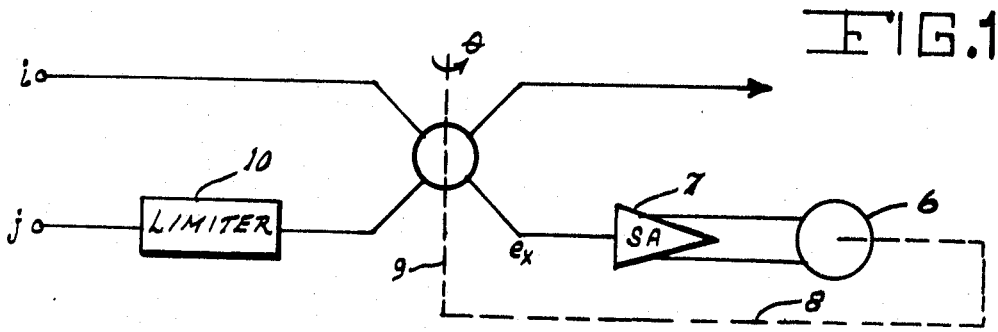
FIG. 1 illustrates schematically a servo mechanism system of the type comprehended by the invention.
Figure 2:
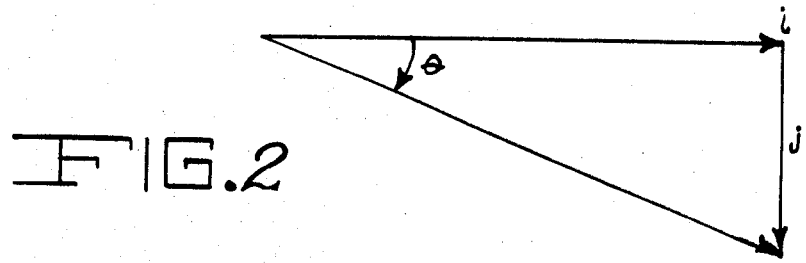
FIG. 2 is a vector diagram of a two-dimensional pointing problem.

In FIG. 1, $i$ and $j$ represent position vectors of a two-dimensional pointing problem. The vector geometry is shown in FIG. 2.

In the amplifier 7 motor 6 combination of FIG. 1, the motor 6 will drive until $e_x$ is reduced to 0. From standard resolver conventions:

$$e_x = j\cos\theta - i\sin\theta \quad (2)$$

since $e_x = 0$ at null $$i\sin\theta = j\cos\theta \quad (2a)$$

and $$j/i = \sin\theta/\cos\theta = \tan\theta. \quad (3)$$

The salient point of the development is that at null $j/i$ is equal to the tangent of the angle to which the system positions.

Referring to Equation (2) the following can be stated:

$$i = K\cos\theta$$
$$j = K\sin\theta$$

at null. The electronic angle limiter of the present invention is based on the fact that the ratio of $j$ to $i$ determines the position of the servo, not the absolute value of either term. Thus by making the ratio constant it is possible to achieve a constant angular position irrespective of absolute values of either $i$ or $j$. By modifying the $j$ or sine input to the servo, it is possible to achieve this constant ratio for any desired angular displacement greater than or less than some constant. This is easily demonstrated starting with Equation (2a). It is desired to modify $j$ such that the servo positions to some angle $\theta$ and limits at this angle even if $j$ should increase further. When the servo limits the following equation will obtain:

$$j/i = \sin\theta/\cos\theta = \tan\phi \quad (4)$$

where $\tan\phi$ is a constant. Thus by setting $j = i\tan\phi$ the position will be constant at $\phi$ for $j > \sin\phi$ and will position normally for $j \leq \sin\phi$. In practice the electronic angle limiter sets two limits with a band of normal operation between the two.

Figure 3:
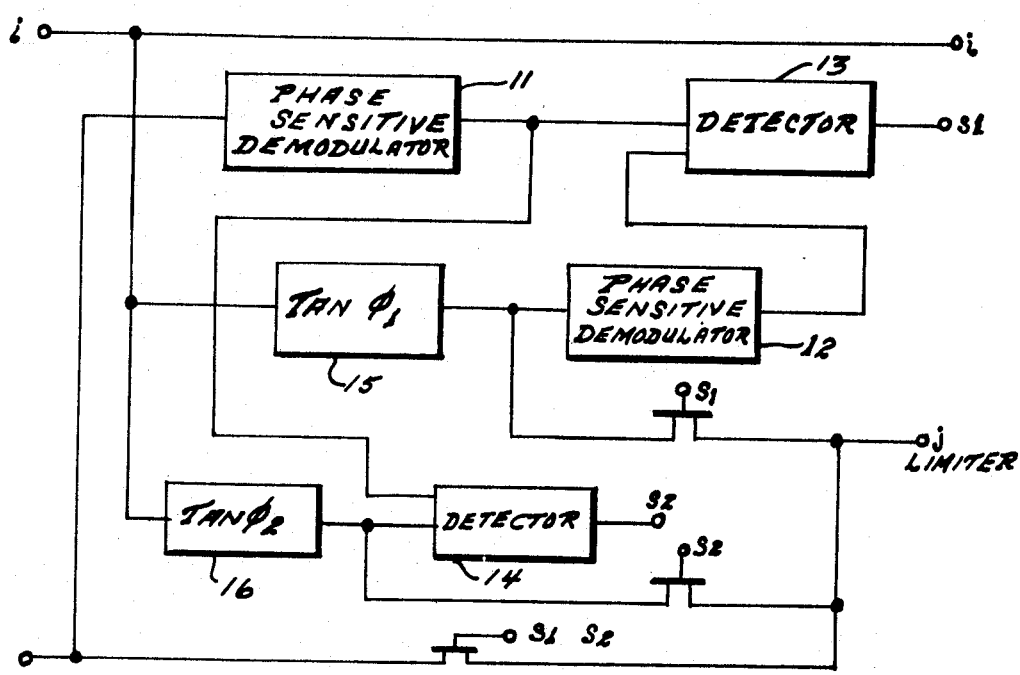
FIG. 3 is a block diagram of one presently preferred embodiment of the invention.

A block diagram of the limiting circuit is shown in FIG. 3.

In operation phase sensitive demodulator 12 and detector 13 in combination with the constant $\tan\phi_1$ (designated by block 15) detects when the angular excursion reaches a first limit and consequently closes switch S1 and and opens switch S1*S2. This removes $j$ from the circuit and replaces it with $i\tan\phi_1$. When the second excursion limit is reached the control circuit comprising phase sensitive demodulator 11 and detector 12 in combination with $\tan\phi_2$ (block 16) closes switch S2 and opens switch S1. This replaces $i\tan\phi_1$ with $i\tan\phi_2$. Between excursion limits the drive circuit operates normally with switch S1*S2 being closed and switches S1 and S2 being open.

By way of example, consider the case of limiting at +2° and −12°. Let $\tan\phi_1 = \tan -12°$ and $\tan\phi_2 = \tan 2°$. The circuit has three possible states:

$$\theta < -12°$$
$$-12° \leq \theta \leq 2°$$
$$\theta > +2°$$

First examine the case of $\theta < -12°$. The inputs to the S1 detector are $j$ and $i\tan 12°$. For $\theta < -12°$, $|j| >> |i\tan 12°|$. The detector senses this and turns on the FET with S1 on the gate. The sin $\theta$ output is set to $i\tan -12°$ and the servo positions to −12°. For $-12° < \theta < 2°$ the two detectors are off and the FET labeled S1*S2 is on and the system operation is normal.

Figure 4:
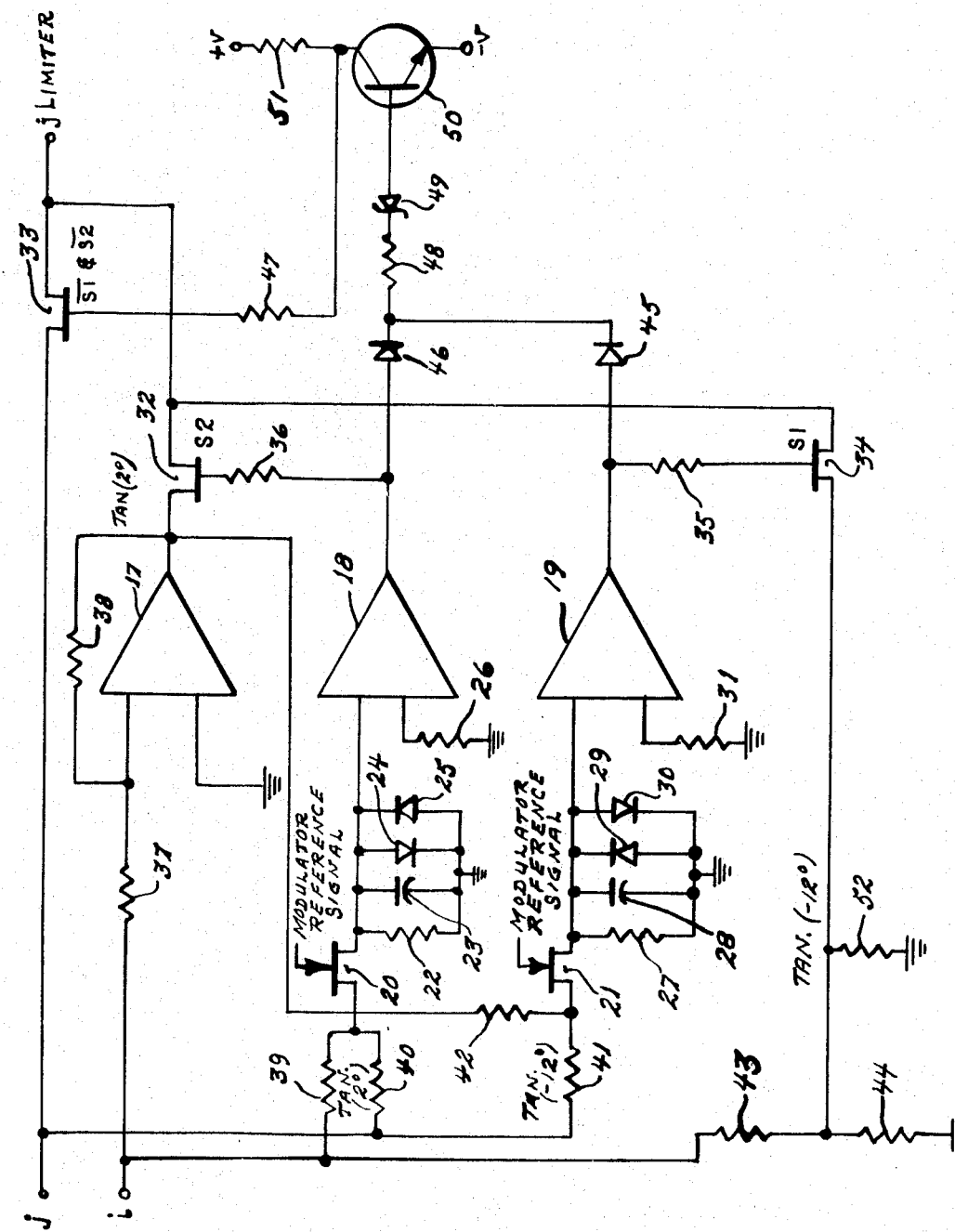
FIG. 4 is a schematic diagram of a device incorporating the principles of the invention to achieve angle limiting at two points.

A circuit which uses this principle is illustrated in FIG. 4. Normal operation $j$ drive is provided when field effect transistor switch 33 is closed. A first limit drive circuit consists of resistors 37, 38, amplifier 17 and field effect transistor switch 32. This represents the tan (2°) limit drive circuit. The tan (−12°) limit drive circuit comprises resistors 43, 44 and field effect transistor switch 34. Resistor 52 represents the load of the succeeding stage. The control circuit for the 2° limit comprises resistors 39, 40, a phase sensitive democulator consisting of field effect transistor 20 and its modulator reference source, and the detector consisting of the op-amp comparator 18, and its summing network of resistor 22, capacitor 23, and diodes 24–25. This control circuit controls switch 32 thru resistors 36.

The control circuit for the −12° limit comprises resistors 41, 42, a phase sensitive demodulator consisting of field effect transistor 21 and its modulator reference source, and the detector consisting of the op-amp comparator 19 and its summing network of resistor 27, capacitor 28 and diodes 29, 30. This control circuit controls switches 34 through resistor 35. The gate of the phase sensitive demodulator reference signals which are square waves either in phase or 180° out of phase with the AC reference source.

A simple transistor inverter consisting of transistor 50, resistors 51, 48 and Zener diode 49, is used to generate $\overline{S1}*\overline{S2}$. Table 1 shows the states of the switches for the three regions:

|  | S1 | S2 | $\overline{S1}*\overline{S2}$ |
|---|---|---|---|
| $\theta < -12$ | 1 | 0 | 0 |
| $-12 \leq \theta \leq +2$ | 0 | 0 | 1 |
| $\theta > +2°$ | 0 | 1 | 0 |

A "1" is equivalent to +15 volts.
A "0" is equivalent to −15 volts.

While it has been shown and described what is considered at present to be a preferred embodiment of the invention, modifications thereto will readily occur to those skilled in the art. It is not therefore desired that the invention be limited to the specific arrangement shown and described and it is not intended to cover in the appended claims all such modifications that fall within the true spirit and scope of the invention.

What is claimed is:

1. In combination with a tangent servo system having first and second servo motor feed circuits,
   electronic angle limiting means comprising,
   a first field effect transistor switch adapter to open and close said first feed circuit,
   a first angle limiting feed circuit comprising first and second resistors connected in series between said second feed circuit and ground, and a second field effect transistor connected between the junction of said first and second resistor and said first feed circuit between said first switch and the servo motor,
   a second angle limiting feed circuit comprising third and four resistors and a third field effect transistor switch connected in series between said second feed circuit and said first feed circuit between said first switch and the servo motor,
   a first control circuit comprising a transistor inverter having its emitter and collector connected to a positive and a negative voltage source respectively and its collector connected to control said first switch,
   a second control circuit comprising fifth and sixth resistors connected in series between said first and second servo motor feed circuits, a first phase sensitive demodulator and a first comparator means connected in series between the junction of said seventh and eighth resistors and the base of said transistor inverter, and means connecting the output of said second comparator means to control said third switch.

* * * * *